No. 618,418. Patented Jan. 31, 1899.
F. E. KEYES.
MACHINE FOR LINING PIPES.
(Application filed Mar. 5, 1897.)
(No Model.)
FIG. 1.
FIG. 2.
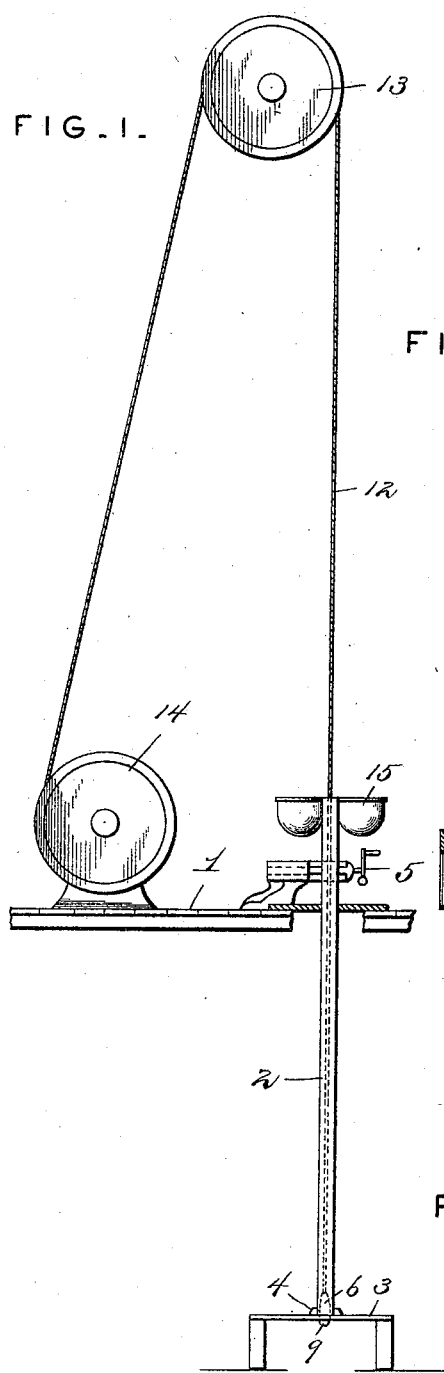
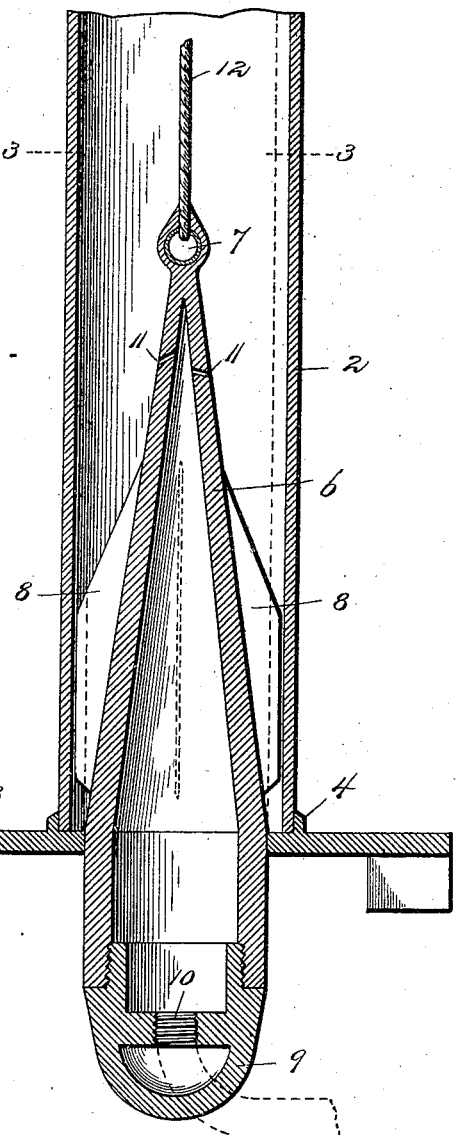
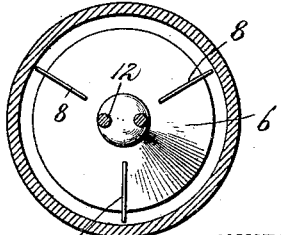
FIG. 3.
WITNESSES
Harry L. Amer.
INVENTOR
Frank Eugene Keyes.
By John Wedderburn
Attorney
THE NORRIS PETERS CO., PHOTO-LITHO., WASHINGTON, D. C.

UNITED STATES PATENT OFFICE.

FRANK EUGENE KEYES, OF NEW YORK, N. Y.

MACHINE FOR LINING PIPES.

SPECIFICATION forming part of Letters Patent No. 618,418, dated January 31, 1899.

Application filed March 5, 1897. Serial No. 625,957. (No model.)

*To all whom it may concern:*

Be it known that I, FRANK EUGENE KEYES, a citizen of the United States, residing at New York, in the county of New York and State of New York, have invented certain new and useful Improvements in Machines for Lining Pipes; and I do hereby declare the following to be a full, clear, and exact description of the invention, such as will enable others skilled in the art to which it appertains to make and use the same.

My invention relates to an improvement in apparatus for lining pipes, and more particularly to means for applying an insulating lining in pipes intended for use as conduits for electrical purposes, the apparatus presenting a simple, cheap, and effective manner of applying a lining or interior coating of non-conducting plastic material which will quickly harden under a change of temperature.

In laying wires under ground it is customary to insulate the wire, which makes it very inconvenient in handling, being necessarily of greatly-increased bulk and the insulation being liable to breakage, whereas by lining or coating the inner side of the conduit a much better insulation is produced and the bare wires can be more quickly handled.

In view of the advantages possessed by lining the conduits instead of insulating the wires I have devised an apparatus by which the plastic composition of non-conducting material can be applied to the interior face of the pipe evenly and of the desired thickness, the invention also contemplating a construction by which the material is partly cooled or set during the process of spreading it to, thereby insure against its running.

Having the above objects in view, my invention consists in providing a spreader comprising a hollow body tapered from one end to the other and provided with lateral wings or blades, the said body having an inlet-opening and outlet-passages.

The invention further consists in certain novel features of construction and combinations and arrangements of parts, as hereinafter set forth, and pointed out in the claims.

In the accompanying drawings, Figure 1 is an elevation showing the several parts of my invention arranged in position for operation. Fig. 2 is an enlarged sectional view of the spreader. Fig. 3 is a transverse sectional view on the line 3 3 of Fig. 2.

In the operation of lining a pipe with my improved apparatus the said pipe is seated on end, and therefore an elevated platform 1 is provided upon which the operator stands in manipulating the device after the parts have been assembled ready for operation. The pipe is designated by the numeral 2, and when in position rests upon a stand or base 3, having a vertical opening corresponding with the opening in the pipe and a step or flange 4, in which the pipe is seated. The upper part or end of the pipe extends through the platform 1 and is supported perpendicularly by means of a clamp or vise 5 of any ordinary or approved construction.

A spreader 6 is used in lining or coating the pipe and consists of a tapered body, the larger end or portion of which is of slightly less diameter than the inner diameter of the pipe, the respective diameters being determined by the thickness it is intended the lining shall be. This spreader is preferably hollow and provided at its smaller end with a transverse opening 7 for connecting the operating rod or cable thereto, and slightly in advance of the enlarged portion of the said spreader is a series of wings 8, which project laterally beyond the plane of the sides and are adapted to bear against the inner wall of the pipe to guide the spreader. The larger end of the spreader is provided with a yoke or loop 9, and when said spreader is made hollow the part adjoining this yoke or loop has an inlet-opening 10, and the smaller end of the spreader is provided with a series of outlet-passages 11, extending backward, as shown.

By providing the yoke or loop 9 an implement or hook can be connected to the spreader for manipulating the same, the hook being also used to raise and handle the pipe before and after it is lined.

In the operation of the device the spreader 6 is drawn from the lower end of the pipe upward to the opposite end thereof, and for this purpose the operating-cable 12 is extended upward over a guide-pulley 13 and from there downward to a drum 14, mounted in suitable bearings and having the usual pawl-and-ratchet mechanism. When the parts are arranged as shown in Fig. 1—that is, with the spreader at the lower end of the pipe—the non-conducting material or plastic compound is poured into the upper end of the pipe, and by pulling upon the operating-cable 12 the spreader will be drawn upward through the pipe, the wings serving to center the same, so that the larger end will properly spread or distribute the material, the track or channel formed by the wings being obliterated by the enlarged end on account of the slight space between the parts.

It will be understood that the tapered end of the spreader will force the material outward, and any surplus that is carried up by the said spreader is caught in a pan or receptacle 15, which encircles the upper end of the pipe.

Ordinarily a solid spreader will answer for spreading certain compositions; but in case it is desired to provide for rapidly cooling the material as it is pressed against the sides of the pipe the said spreader is made hollow, as hereinbefore described, and to the inlet-opening 10 may be attached a flexible pipe for supplying cold water, or in case it is desired to soften the material the said pipe is used to conduct steam, which, passing out through the outlet-opening 11, will act to soften the material.

Having thus described my invention, what I claim as new, and desire to secure by Letters Patent, is—

1. In an apparatus for lining pipes, a hollow tapering spreader, means for moving and for guiding said spreader through a pipe and means for circulating fluid from end to end of the spreader and permitting the discharge of said fluid into the pipe from the smaller end of the spreader, substantially as set forth.

2. A spreader for distributing material in forming a lining within a pipe, comprising a hollow body tapered from its larger portion upward, wings projecting from the tapered portion of the body, a loop or yoke at the butt-end of said body, and a pipe communicating with the said larger end, the upper or smaller end of the spreader having a series of apertures inclined downward, substantially as shown and for the purpose set forth.

3. A device for distributing material in forming a lining for pipes or other conduits, consisting of a hollow spreader tapered substantially as shown and provided with an inlet-opening at its larger end and outlet-passages at its smaller end, a yoke or cap at the larger end of the spreader, and wings or guides projecting laterally from the tapered portion of the spreader, for the purpose set forth.

In testimony whereof I have signed this specification in the presence of two subscribing witnesses.

FRANK EUGENE KEYES.

Witnesses:
PETER MAXEY,
THOMAS MURPHY.